(12) United States Patent
Kim et al.

(10) Patent No.: US 9,544,619 B2
(45) Date of Patent: Jan. 10, 2017

(54) MULTI-VIEW VIDEO STREAMING SYSTEM AND PROVIDING METHOD THEREOF

(71) Applicant: NEXT AEON INC., Gwangju (KR)

(72) Inventors: Gyu Hyon Kim, Seoul (KR); Hyun Kyu Sin, Seoul (KR)

(73) Assignee: NEXT AEON INC., Gwangju (KR)

( * ) Notice: Subject to any disclaimer, the term of this patent is extended or adjusted under 35 U.S.C. 154(b) by 0 days.

(21) Appl. No.: 14/561,155

(22) Filed: Dec. 4, 2014

(65) Prior Publication Data

US 2015/0195611 A1    Jul. 9, 2015

(30) Foreign Application Priority Data

Nov. 27, 2013    (KR) .......................... 10-2013-0145618

(51) Int. Cl.
| | |
|---|---|
| *H04N 21/218* | (2011.01) |
| *H04N 21/2187* | (2011.01) |
| *H04N 21/47* | (2011.01) |
| *H04N 21/472* | (2011.01) |
| *H04N 21/21* | (2011.01) |
| *H04N 21/20* | (2011.01) |
| *H04N 21/239* | (2011.01) |

(Continued)

(52) U.S. Cl.
CPC ........ *H04N 21/21805* (2013.01); *H04N 21/20* (2013.01); *H04N 21/21* (2013.01); *H04N 21/218* (2013.01); *H04N 21/2187* (2013.01); *H04N 21/2393* (2013.01); *H04N 21/2543* (2013.01); *H04N 21/25808* (2013.01); *H04N 21/25866* (2013.01); *H04N 21/47* (2013.01); *H04N 21/472* (2013.01); *H04N 21/47202* (2013.01); *H04N 21/47211* (2013.01); *H04N 21/47217* (2013.01)

(58) Field of Classification Search
CPC ................................................ H04N 21/21805
See application file for complete search history.

(56) References Cited

U.S. PATENT DOCUMENTS 7,448,063 B2 * 11/2008 Freeman et al. ............... 725/136
2004/0202443 A1 * 10/2004 Obrador et al. .................. 386/4
(Continued)

FOREIGN PATENT DOCUMENTS

| | | |
|---|---|---|
| KR | 10-2007-0097435 A | 10/2007 |
| KR | 10-0781275 B1 | 11/2007 |

*Primary Examiner* — Justin Shepard
(74) *Attorney, Agent, or Firm* — Knobbe Martens Olson & Bear LLP (57) ABSTRACT

A multi-view video streaming system and a method of providing the same. A streaming module streams at least part of individual-view videos of a multi-view video taken at different views to a user terminal under the control of a control module. Each individual-view video corresponds to at least part of predefined user types. A command receiving module receives a view movement command from the user terminal. An target view determination module determines an target individual-view video to be streamed to the user terminal from among the individual-view videos based on the view movement command. A user type determination module determines a user type of a user corresponding to the user terminal from among the predefined user types. The streaming module streams the target individual-view video to the user terminal when the type of the user corresponds to a user type set to the target individual-view video.

6 Claims, 10 Drawing Sheets

(51) Int. Cl.
*H04N 21/2543* (2011.01)
*H04N 21/258* (2011.01)

(56) References Cited

U.S. PATENT DOCUMENTS

| | | | |
|---|---|---|---|
| 2008/0209472 A1* | 8/2008 | Shanks et al. | 725/43 |
| 2010/0235857 A1* | 9/2010 | Lestage et al. | 725/37 |
| 2012/0098925 A1* | 4/2012 | Dasher | H04N 5/247 348/36 |

* cited by examiner

```
         ┌─────────────────────────────┐
         │ ----→  1st, 2nd and 3rd Types│
         │ ──→    2nd and 3rd Types     │
         │ ━━▶    3rd Type              │
         └─────────────────────────────┘

V₁  ━━━━▶
V₂  ──→
V₃  ──→
V₄  -----→
V₅  -----→
V₆  -----→
V₇  ──→
V₈  ──→
V₉  ━━━━▶
```

$V_1$   3rd Type
$V_2$   2nd and 3rd Types
$V_3$   2nd and 3rd Types
$V_4$   1st, 2nd and 3rd Types
$V_5$   1st, 2nd and 3rd Types
$V_6$   1st, 2nd and 3rd Types
$V_7$   2nd and 3rd Types
$V_8$   2nd and 3rd Types
$V_9$   3rd Type

MULTI-VIEW VIDEO STREAMING SYSTEM AND PROVIDING METHOD THEREOF

BACKGROUND OF THE INVENTION

Field of the Invention

The present invention relates to a multi-view video streaming system and a method of providing the same. More particularly, the present invention relates to a multi-view video streaming system able to provide a charging method suitable for multi-view videos and a method of providing the same.

Description of Related Art

In response to the emergence of the digital age, a variety of multimedia technologies are rapidly developing, and the digital content market based on such multimedia technologies is growing remarkably. Along with this trend, interest for realistic media in the digital video field is also increasing. Recently, studies are actively underway for multi-view videos, one type of realistic media.

A typical multi-view video system takes a multi-view video of a single scene using multi-view cameras, and encodes the taken multi-view video for the purpose of efficient transmission of the taken images. At a receiving terminal, the multi-view images are decoded from the transmitted compressed bit stream, and a variety of application services are provided using the decoded multi-view images on the request from the audience.

Figure 1:
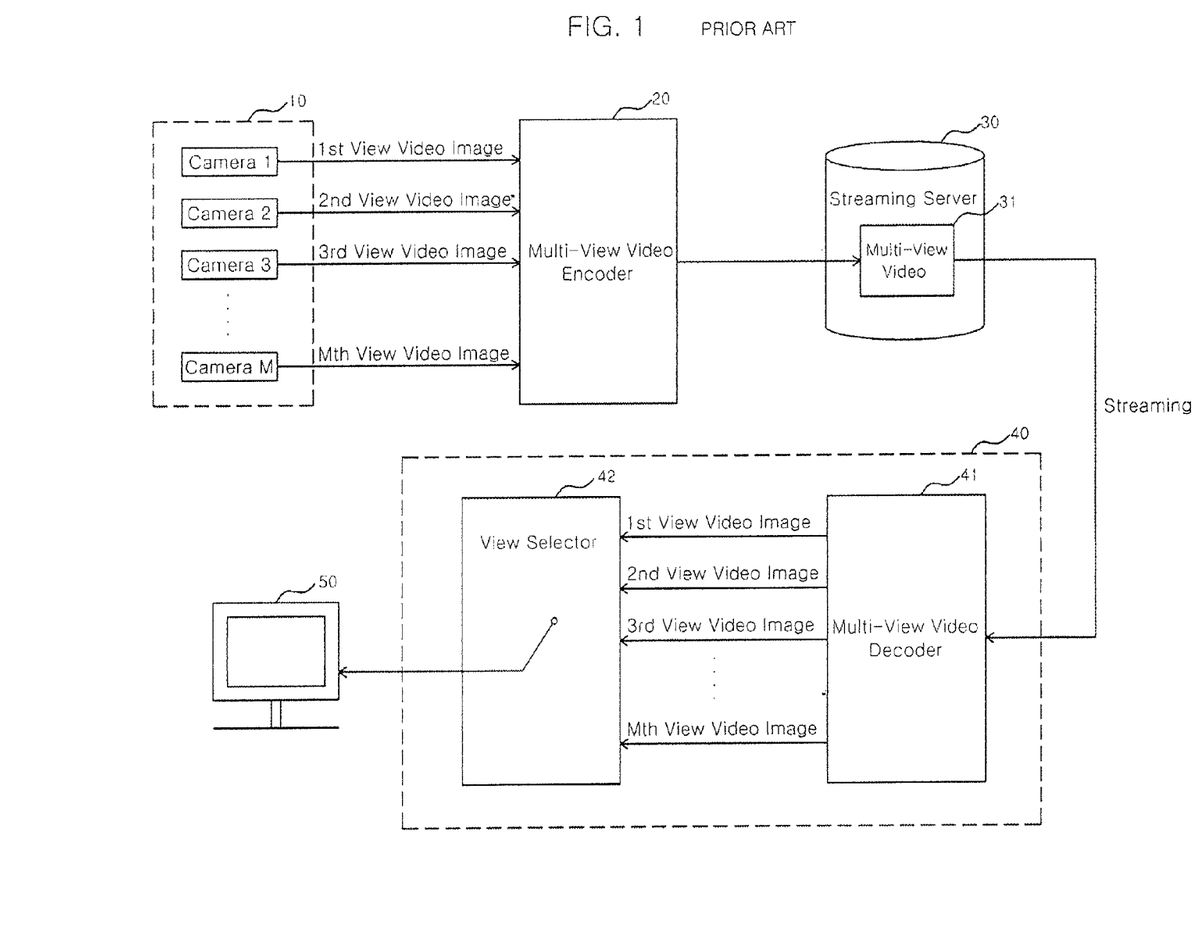
FIG. 1 illustrates a multi-view video streaming system of the related art.

FIG. 1 illustrates a multi-view video streaming system of the related art. As illustrated in FIG. 1, in the multi-view video streaming system of the related art, a multi-view video file 31 is created by encoding/multiplexing individual multi-view images taken by a plurality of cameras 10. A multi-view video streaming server 30 can stream the created multi-view video file 31 to a user terminal 40. A multi-view image decoder 41 included in the user terminal 40 can divide the multi-view video stream into individual-view video streams through demultiplexing/decoding. A view selector selects a single individual-view video stream desired by the user and outputs the selected individual-view video stream to a display device 50.

In response to the active studies on multi-view videos and the increasing multi-view video market as described above, desires to yield profit using multi-view videos are increasing as time goes on. Therefore, a charging method suitable for multi-view videos is earnestly required.

BRIEF SUMMARY OF THE INVENTION

Various aspects of the present invention provide a multi-view video streaming system able to provide a charging method suitable for multi-view videos and a method of providing the same.

In an aspect of the present invention, provided is a multi-view video streaming system including: a control module; a streaming module streaming at least part of a plurality of individual-view videos to a user terminal under control of the control module, the plurality of individual-view videos being taken at different views and forming a multi-view video, wherein each of the plurality of individual-view videos is set to correspond to at least part of a plurality of predefined user types; a command receiving module receiving a view movement command from the user terminal; an target view determination module determining an target individual-view video to be streamed to the user terminal from among the plurality of individual-view videos based on the view movement command; and a user type determination module determining a user type of a user corresponding to the user terminal from among the plurality of predefined user types. The control module controls the streaming module to stream the target individual-view video to the user terminal when the user type of the user corresponds to a user type set to the target individual-view video.

According to an embodiment of the present invention, the plurality of predefined user types may include a charge-type and a free-type.

The target view determination module may determine an individual-view video from among the plurality of individual-view videos to be the target individual-view video. The determined individual-view video is close, in a view movement direction corresponding to the view movement command, to a current individual-view video that the user terminal is displaying. The control module may transmit charging-guideline information to the user terminal when the user type set to the target individual-view video is the charge-type and the user type of the user of the user terminal is the free-type.

The target view determination module may determine an individual-view video from among the plurality of individual-view videos to be the target individual-view video. The determined individual-view video is most close, in a view movement direction corresponding to the view movement command, to a current individual-view video that the user terminal is displaying. The determined individual-view video is set to correspond to the user type of the user.

The target view determination module may determine the current individual-view video to be the target individual-view video when none of the individual-view videos positioned in the view movement direction of the current individual-view video is set to correspond to the user type of the user.

In another aspect of the present invention, provided is a multi-view video streaming system including: a control module; a streaming module streaming at least part of a plurality of individual-view videos to a user terminal under control of the control module, the plurality of individual-view videos being taken at different views and forming a multi-view video, wherein each of the plurality of individual-view videos is set to correspond to at least part of a plurality of predefined user types; a command receiving module receiving a view movement command from the user terminal; an target view determination module determining an individual-view video from among the plurality of individual-view videos to be an target individual-view video to be streamed to the user terminal, the determined individual-view video being most close, in a view movement direction corresponding to the view movement command, to a current individual-view video that the user terminal is displaying, and the determined individual-view video being set to correspond to the user type of the user; and a user type determination module determining a user type of a user corresponding to the user terminal from among the plurality of predefined user types. The control module controls the streaming module to stream the target individual-view video to the user terminal.

In a further aspect of the present invention, provided is a multi-view video streaming system including: a storage module, wherein a plurality of bulk video data corresponding to a plurality of predefined user types are stored in the storage module, and wherein the plurality of bulk video data corresponding to the plurality of predefined user types includes at least part of a plurality of individual-view videos that are taken at different views and form a multi-view video; a control module; a streaming module streaming at least one bulk video data from among the plurality of bulk video data or at least one individual-view video included in the one bulk video data from among the plurality of bulk video data to a user terminal under control of the control module; and a user type determination module determining a user type of a user corresponding to the user terminal from among the plurality of predefined user types. The control module controls the streaming module to stream a bulk video data corresponding to the user type of the user or at least one individual-view video included in the bulk video data corresponding to the user type of the user to the user terminal.

In another aspect of the present invention, provided is a multi-view video streaming system including: a command input module having a view movement command input thereto; an target-view determination module determining an target individual-view video to be streamed to a user terminal from among a plurality of individual-view videos based on the view movement command, the plurality of individual-view videos being taken at different views and forming a multi-view video, wherein each of the plurality of individual-view videos is set to correspond to at least part of a plurality of predefined user types; a streaming module receiving a video stream corresponding to the target individual-view video from a multi-view video streaming server; a user type receiving module receiving a user type set to the target individual-view video from the multi-view video streaming server; a user type determination module determining a user type of a user corresponding to the user terminal from among the plurality of predefined user types; and a control module streaming the target individual-view video to the user terminal when the user type of the user corresponds to the user type set to the target individual-view video.

According to an embodiment of the present invention, the plurality of predefined user types may include a charge-type and a free-type. The control module may transmit charging-guideline information to the user terminal when the user type set to the target individual-view video is the charge-type and the user type of the user of the user terminal is the free-type.

In a further aspect of the present invention, provided is a method of providing a multi-view video streaming system that streams at least part of a plurality of individual-view videos to a user terminal, the plurality of individual-view videos being taken at different views and forming the multi-view video stream. The method includes: setting, at the multi-view video streaming system, each of the plurality of individual-view videos to correspond to at least part of a plurality of predefined user types; receiving, at the multi-view video streaming system, a view movement signal from the user terminal; determining, at the multi-view video streaming system, an target individual-view video from among the plurality of individual-view videos to be streamed to the user terminal based on the view movement signal; determining, at the multi-view video streaming system, a user type of a user corresponding to the user terminal from among the plurality of predefined user types; and streaming, at the multi-view video streaming system, the target individual-view video to the user terminal when the user type of the user corresponds to a user type set to the target individual-view video.

According to an embodiment of the present invention, the plurality of predefined user types includes a charge-type and a free-type.

The process of determining the target individual-view video from among the plurality of individual-view videos may include determining an individual-view video from among the plurality of individual-view videos to be the target individual-view video, the determined individual-view video being close, in a view movement direction corresponding to the view movement command, to a current individual-view video that the user terminal is displaying. The method may further include transmitting charging-guideline information to the user terminal when the user type set to the target individual-view video is the charge-type and the user type of the user of the user terminal is the free-type.

The process of determining the target individual-view video from among the plurality of individual-view videos may include determining an individual-view video from among the plurality of individual-view videos to be the target individual-view video. The determined individual-view video is most close, in a view movement direction corresponding to the view movement command, to a current individual-view video that the user terminal is displaying, and is set to correspond to the user type of the user.

The process of determining the target individual-view video from among the plurality of individual-view videos may include determining the current individual-view video to be the target individual-view video when none of the individual-view videos positioned in the view movement direction of the current individual-view video is set to correspond to the user type of the user.

In another aspect of the present invention, provided is a method of providing a multi-view video streaming system that streams at least part of a plurality of individual-view videos to a user terminal, the plurality of individual-view videos being taken at different views and forming the multi-view video stream. The method includes: setting, at the multi-view video streaming system, each of the plurality of individual-view videos to correspond to at least part of a plurality of predefined user types; receiving, at the multi-view video streaming system, a view movement signal from the user terminal; determining, at the multi-view video streaming system, an individual-view video from among the plurality of individual-view videos to be an target individual-view video to be streamed to the user terminal, the determined individual-view video being most close, in a view movement direction corresponding to the view movement command, to a current individual-view video that the user terminal is displaying, and the determined individual-view video being set to correspond to the user type of the user; determining, at the multi-view video streaming system, a user type of a user corresponding to the user terminal from among the plurality of predefined user types; and streaming the target individual-view video to the user terminal.

In a further aspect of the present invention, provided is a method of providing a multi-view video streaming system including: storing, at the multi-view video streaming system, a plurality of bulk video data corresponding to a plurality of predefined user types in the storage module, wherein the plurality of bulk video data corresponding to the plurality of predefined user types includes at least part of a plurality of individual-view videos that are taken at different views and form a multi-view video; determining, at the multi-view video streaming system, a user type of a user corresponding to a user terminal from among the plurality of predefined user types, the user terminal being connected to the multi-view video streaming system; and streaming, at the multi-view video streaming system, a bulk video data corresponding to the user type of the user or at least one individual-view video included in the bulk video data corresponding to the user type of the user to the user terminal.

In another aspect of the present invention, provided is a method of providing a multi-view video streaming system including: having, at the multi-view video streaming system, a view movement command input thereto; determining, at the multi-view video streaming system, an target individual-view video to be streamed to a user terminal from among a plurality of individual-view videos based on the view movement command, the plurality of individual-view videos being taken at different views and forming a multi-view video, wherein each of the plurality of individual-view videos is set to correspond to at least part of a plurality of predefined user types; receiving, at the multi-view video streaming system, a video stream corresponding to the target individual-view video from a multi-view video streaming server; receiving, at the multi-view video streaming system, a user type set to the target individual-view video from the multi-view video streaming server; determining, at the multi-view video streaming system, a user type of a user corresponding to the user terminal from among the plurality of predefined user types; and streaming, at the multi-view video streaming system, the target individual-view video to the user terminal when the user type of the user corresponds to the user type set to the target individual-view video.

According to an embodiment of the present invention, the plurality of predefined user types includes a charge-type and a free-type. The method further includes: transmitting charging-guideline information to the user terminal when the user type set to the target individual-view video is the charge-type and the user type of the user of the user terminal is the free-type.

In further another aspect of the present invention, provided is a computer readable recording medium in which a program enabling the above-described method to be carried out is recorded.

In still another aspect of the present invention, provided is a multi-view video streaming system including: a processor; and a memory preserving a computer program that the processor executes. The computer program enables the above-described method to be carried out when the computer program is executed by the processor.

According to the present invention as set forth above, the multi-view video streaming system limits or allows a predetermined view of a multi-view video according to the user type of the user (e.g. the charge-type or the free-type), thereby providing a charge model suitable for multi-view videos.

The methods and apparatuses of the present invention have other features and advantages that will be apparent from or are set forth in greater detail in the accompanying drawings which are incorporated herein, and in the following Detailed Description of the Invention, which together serve to explain certain principles of the present invention.

BRIEF DESCRIPTION OF THE DRAWINGS

A brief description is given for the enhancement of understanding of the accompanying drawings, in which.

DETAILED DESCRIPTION OF THE INVENTION

Exemplary embodiments of the present invention will be described below in detail with reference to the accompanying drawings since the present invention may have various changes in forms and have a variety of embodiments. It is to be understood, however, that the present description is not intended to limit the invention to those exemplary embodiments. On the contrary, the invention is intended to cover not only the exemplary embodiments, but also various alternatives, modifications, equivalents and other embodiments that may be included within the spirit and scope of the invention. In the following description of the present invention, detailed descriptions of known functions and components incorporated herein will be omitted in the case that the subject matter of the present invention is rendered unclear.

It will be understood that although the terms "first", "second", etc. are used herein to describe various elements, these elements should not be limited by these terms. These terms are only used to distinguish one element from another element.

The terms used in this application are used to only describe specific embodiments and are not intended to restrict the present invention. An expression of the singular number includes an expression of the plural number unless clearly defined otherwise in the context.

It will be further understood that the terms "comprise", "include," "have" and variations thereof, when used herein, specify the presence of stated features, integers, steps, operations, elements, components or combinations thereof, but do not preclude the presence or addition of one or more other features, integers, steps, operations, elements, components, or combinations thereof.

It will be understood that when an element transmits data to another element, it can directly transmit to the other element or at least one intervening element may be present. In contrast, when an element "directly transmits" data to another element, there are no intervening elements present.

Hereinafter, exemplary embodiments of the present invention able to specifically realizing the principle of a lock screen system including a plurality of screen windows will be described with reference to the accompanying drawings. The same reference numerals provided in each drawing denote the same components.

Figure 2:
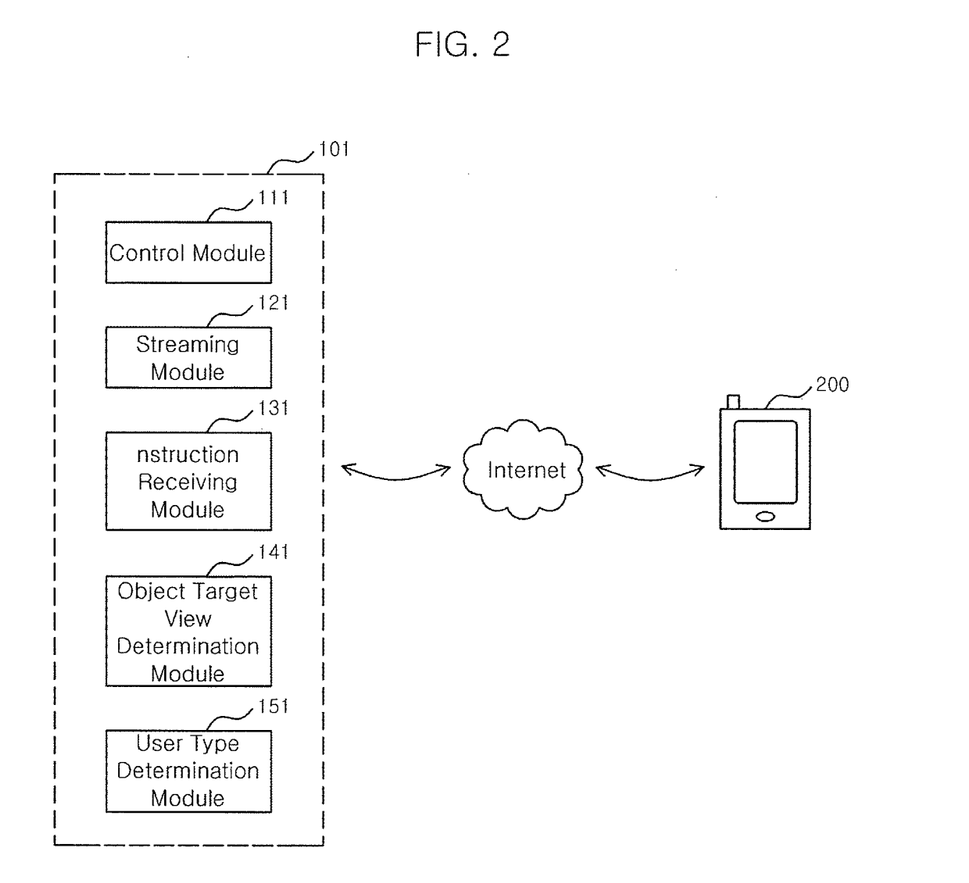
FIG. 2 illustrates a multi-view video streaming system according to an exemplary embodiment of the present invention.

FIG. 2 illustrates a multi-view video streaming system according to an exemplary embodiment of the present invention.

Referring to FIG. 2, the multi-view video streaming system 101 according to this embodiment is configured to provide a multi-view video stream.

In the embodiment illustrated in FIG. 2, the multi-view video streaming system 101 streams a multi-view video to a user terminal 200 via the Internet or another network (e.g. a local area network (LAN)).

The multi-view video consists of a plurality of individual-view videos taken at different views. Each individual-view video may refer to an image or images taken at a specific view using a single camera. Two individual-view videos adjacent to each other may refer to images respectively taken using two cameras adjacent to each other.

The multi-view video streaming system 101 streams at least one individual-view video of the plurality of individual-view videos to the user terminal 200. In the case of streaming two or more individual-view videos to the user terminal 200, the multi-view video streaming system 101 transmits the two or more individual-view videos to the user terminal 200 by encoding/multiplexing the two or more individual-view videos. The user terminal 200 displays one of the two or more individual-view videos through decoding/demultiplexing.

Examples of the user terminal 200 may include, but not limited to, a computer, a laptop, a notebook computer, a desktop computer, a tablet personal computer (PC), a personal digital assistant (PDA) and a workstation. Examples of the user terminal 200 may include, but not limited to, a mobile phone, a satellite phone, a wireless phone, a session initiation protocol (SIP) phone, a wireless local loop (WLL) station, a smartphone, a wireless computing device including a handheld device having wireless connectivity, and a processing device connected to a wireless modem.

As illustrated in FIG. 2, the multi-view video streaming system 101 includes a control module 111, a streaming module 121, a command receiving module 131, a target view determination module 141 and a user type determination module 151. In some embodiments of the present invention, some of the above-described components may not be necessarily necessary for implementing the invention. The multi-view video streaming system 101 may include more components.

The multi-view video streaming system 101 may have a hardware resource and/or a software resource in order to embody the principle of the present invention, and does not necessarily indicate a single physical component or a single device. Specifically, the multi-view video streaming system 101 may be implemented as a logical combination of hardware and/or software provided to embody the principle of the invention, and if necessary, may be implemented as an assembly of logical components that are disposed at separate devices to perform their own functions in order to embody the principle of the invention. In addition, the multi-view video streaming system 101 may indicate an assembly of components provided according to the functions or roles to embody the principle of the invention. For example, the control module 111, the streaming module 121, the command receiving module 131, the target view determination module 141 and/or the user type determination module 151 may be located in different physical devices or the same physical device. In addition, in some implementations, the control module 111, the streaming module 121, the command receiving module 131, the target view determination module 141 and/or the user type determination module 151 may be located in different physical devices such that they are systematically combined in order to realize functions that are performed by individual modules.

Herein, the term "module" may refer to a functional and/or structural combination of hardware for embodying the principle of the invention and software for enabling the hardware to operate. For example, the module may mean a logical unit of codes and hardware resources that execute the codes. It is apparent to a person skilled in the art to which the present invention relates that the module does not necessarily indicate either physically-connected codes or one type of hardware.

The control module 111 controls the functions and/or resources of the other components (e.g. the streaming module 121, the command receiving module 131, the target view determination module 141 and/or the user type determination module 151) of the multi-view video streaming system 101 according to this embodiment.

The streaming module 121 streams at least part of the plurality of individual-view videos of the multi-view video to the user terminal 200 under the control of the control module 111.

The multi-view video streaming system 101 sets the plurality of individual-view videos such that each of the plurality of individual-view videos corresponds to at least part of a plurality of predefined user types.

The plurality of predefined user types may include, for example, a charge-type in which a predetermined amount of price is paid for the multi-view video to be provided and a free-type in which the multi-view video is provided free.

It is apparent to a person skilled in the art that the user types may be any types in addition to the charge-type and the free-type as long as the characters, types and kinds of users can be classified according to the user types.

In some embodiments, the charge type may be divided into sub-charge types according to the amount or the type of the price. For example, the charge type may include a flat sum type in which a plurality of multi-view videos can be provided from the multi-view video streaming system 101 for a predetermined period (e.g. day, month or year), a single product type in which only a specific multi-view video can be provided, and the like.

Figure 3A:
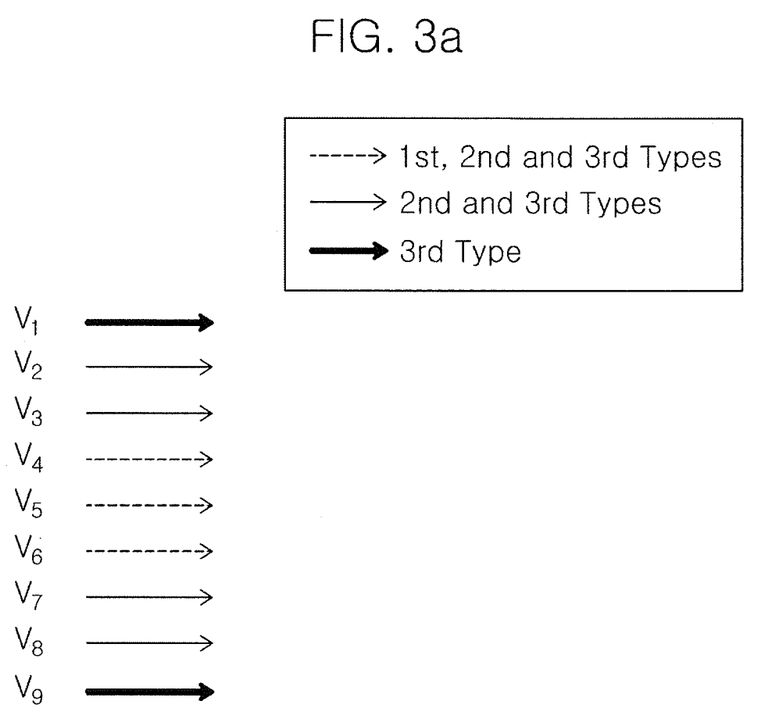
FIG. 3A and FIG. 3B illustrate examples in each of which a plurality of individual-view videos of a single multi-view video are set to at least part of a plurality of predefined user types.
Figure 3B:
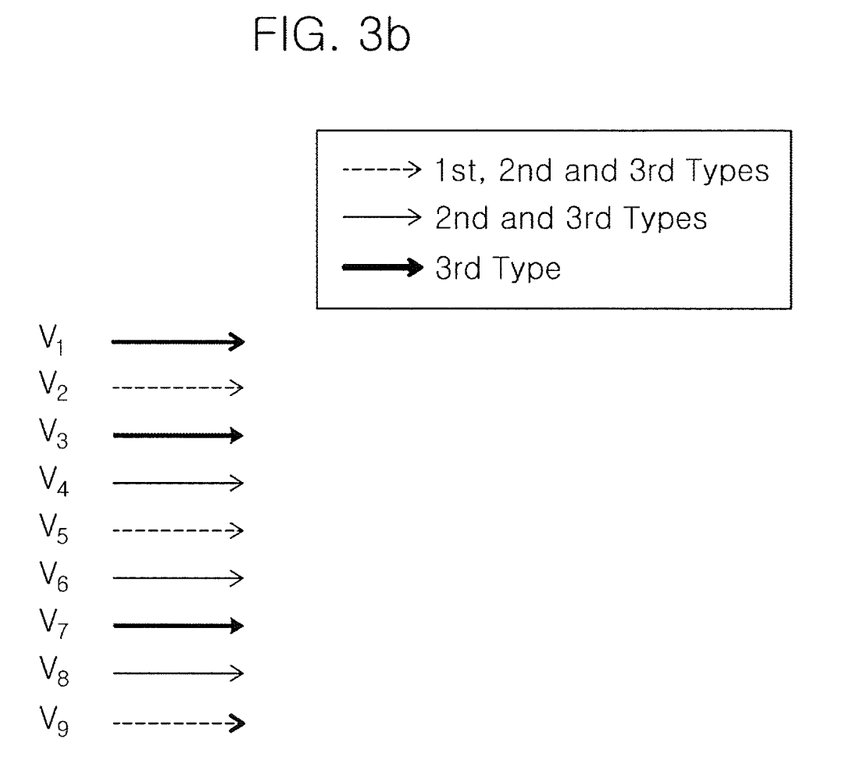

FIG. 3A and FIG. 3B illustrate examples in each of which a plurality of individual-view videos of a single multi-view video are set to at least part of a plurality of predefined user types. In the examples illustrated in FIG. 3A and FIG. 3B, the user types are divided into three types (first to third types), and the multi-view video consists of nine individual-view videos V1 to V9. For example, the first type may be a free-type, the second type may be an undercharge-type, and the third type may be an overcharge-type in which users pay more than users corresponding to the second type.

First, referring to FIG. 3A, the individual-view videos of the multi-view video are set such that each of the three individual-view videos V4 to V6 corresponds to the first to third types, and each of the four individual-view videos V2, V3, V7 and V8 corresponds to the second and third type. The individual-view videos V2, V3, V7 and V8 are closely positioned above and below the individual-view videos V4 and V6 corresponding to the first to third types. In addition, each of the two individual-view videos V1 and V9 corresponds to the third type. The individual-view videos V1 and V9 are closely positioned above and below the individual-view videos V2 and V8.

As will be described later, the multi-view video streaming system 101 provides a user who wants the multi-view video with only an individual-view video corresponding to the user type of the user. Therefore, a user corresponding to the first type cannot watch an individual-view video corresponding to either the second or third type, and a user corresponding to the second type cannot watch an individual-view video corresponding to the third type. That is, the multi-view video streaming system 101 allows a user corresponding to either the first or second type to watch only a multi-view video having a limited viewing angle (e.g. 30° upwards or downwards from the front). Therefore, the multi-view video streaming system 101 can provide a charging model in which the maximum viewing angle is limited according to whether or not the service is charged or according to the type of the charging.

Referring to FIG. 3B, the individual-view videos of the multi-view video are set different from the example illustrated in FIG. 3A in which the individual-view videos of the same types are continuously distributed. Specifically, each of the three individual-view videos V2, V5 and V9 corresponds to the first to third types, each of the four individual-view videos V1, V4, V6 and V8 corresponds to the second and third types, and each of the two individual-view videos V3 and V7 corresponds to the third type.

As the user types are set to the individual-view videos in this manner, the multi-view video streaming system 101 provides the charging model in which only a user who has paid can watch an individual-view video according to a specific view.

Returning to FIG. 2, the command receiving module 131 receives a view movement signal from the user terminal 200.

For this, the user terminal 200 has the view movement signal input from the user by means of an input device (not shown) provided therein. When the view movement command is input, the user terminal 200 transmits a view movement signal corresponding to the view movement command to the multi-view video streaming system 101. The input device may be implemented as, for example, a keyboard, a keypad, a touchpad or a touchscreen. The view movement command and the view movement signal may include information about the view movement direction. Examples of the view movement direction may include vertical directions, horizontal directions and diagonal directions.

Figure 4:
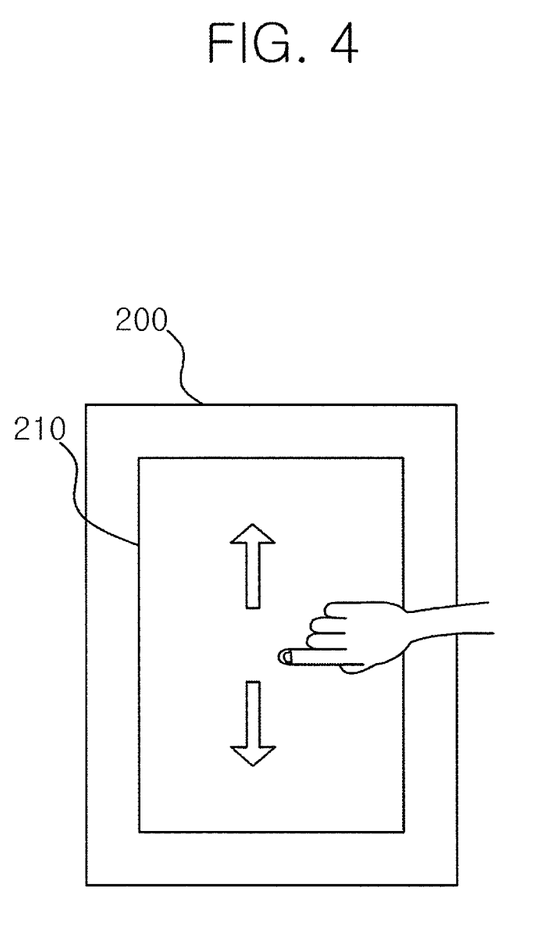
FIG. 4 illustrates an example in which a view movement command is input via a touchscreen.

FIG. 4 illustrates an example in which a view movement command is input via a touchscreen. As illustrated in FIG. 4, when an object such as a finger or a stylus moves on a touchscreen 210 provided in the user terminal 200, the user terminal 200 senses the movement of the object. When the movement of the object is sensed, the user terminal 200 determines that a view movement command is input. For example, the user terminal 200 recognizes that a downward view movement command is input when the object moves upwards and that an upward view movement command is input when the object moves downwards. In contrast, in an alternative embodiment, the direction of a view movement command is recognized the direction in which the object moves. The view movement signal includes information about a view movement direction that can be determined from the view movement command.

Returning to FIG. 2, the user type determination module 151 determines the user type of the user corresponding to the user terminal 200 from among the plurality of user types. For example, the user type determination module 151 determines whether the user type of the user is the charge-type or the free-type based on the details of the charge (e.g. charged multi-view videos and charged price). When the type of the user is the charge-type, the charge-type can be determined to be the undercharge-type or the overcharge-type.

The target view determination module 141 determines a target individual-view video to be streamed to the user terminal 200 from among the plurality of individual-view videos based on the view movement signal.

According to an embodiment, the target view determination module 141 determines an individual-view video from among the plurality of individual-view videos to be the target individual-view video. The determined individual-view video that is closest, in the view movement direction corresponding to the view movement command, to the current individual-view video that the user terminal is displaying, and is set to correspond to the user type of the user corresponding to the user terminal 200.

For example, it may be assumed that the user types are set to the individual-view videos as illustrated in FIG. 3B.

It may be assumed that the user type of the user is the first type, the streaming module 121 is streaming the individual-view video V2 to the user terminal 200, and the user terminal 200 is displaying the individual-view video V2. When the user terminal receives a downward view movement command and transmits a downward view movement signal in a responsive manner, the target view determination module 141 according to this embodiment determines the individual-view video V5 to be the target individual-view video. The individual-view video V5 is closest to the current individual-view video V2 in the downward direction, and corresponds to the user type (i.e. the first type) of the user.

When the user type of the user corresponds to the user type set to the individual-view video, the control module 111 controls the streaming module 121 to stream the target individual-view video to the user terminal. Therefore, in the above example, since the user type (i.e. the first type) set to the target individual-view video V5 is the same as the user type (i.e. the first type) of the user, the control module 111 controls the streaming module 121 to stream the target individual-view video V5 to the user terminal.

In another example, it may be assumed that the user type of the user is the second type, the streaming module 121 is streaming the individual-view video V2 to the user terminal 200, and the user terminal 200 is displaying the individual-view video V2. When the user terminal 200 receives a downward view movement command and transmits a downward view movement signal in a responsive manner, the target view determination module 141 according to this embodiment determines the individual-view video V4 to be the target individual-view video. The individual-view video V4 is closest to the current individual-view video V2 in the downward direction, and corresponds to the user type (i.e. the second type) of the user.

In an embodiment, when none of the individual-view videos positioned in the view movement direction of the current individual-view video is set to correspond to the user type of the user, the target view determination module 141 determines the current individual-view video to be the target individual-view video.

For example, it is assumed that the user type sets to the individual-view videos are the same as illustrated in FIG. 3A.

It may be assumed that the user type of the user is the first type, the streaming module 121 is streaming the individual-view video V5 to the user terminal 200, and the user terminal 200 is displaying the individual-view video V5. When the user terminal receives an upward view movement command and transmits an upward view movement signal in a responsive manner, the target view determination module 141 determines the individual-view video V4 to be the target individual-view video. The individual-view video V4 is closest to the current individual-view video V5 in the upward direction, and corresponds to the user type (i.e. the first type) of the user.

Afterwards, when the user terminal 200 receives an upward view movement command and transmits an upward view movement signal, none of the individual-view videos V1 to V3 positioned above the current individual-view video V4 corresponds to the user type (i.e. the first type) of the user. Accordingly, the target view determination module 141 determines the current individual-view video V4 to be the target individual-view video.

In another embodiment, the target view determination module 141 determines an individual-view video from among the plurality of individual-view videos to be the target individual-view video. The determined individual-view video is adjacent, in the view movement direction corresponding to the view movement command, to the current individual-view video that the user terminal 200 is displaying. In this case, when the user type set to the target individual-view video is the charge-type, and the user type of the user is the free-type, the control module 111 transmits charging-guideline information to the user terminal.

The charging-guideline information includes, for example, fee information and payment information required for watching the other individual-view videos included in the corresponding multi-view video, information about an charging-guideline page (e.g. the uniform resource locator (URL) of the information page) for the watching, and information about a login page for access to the information page.

Figure 5:
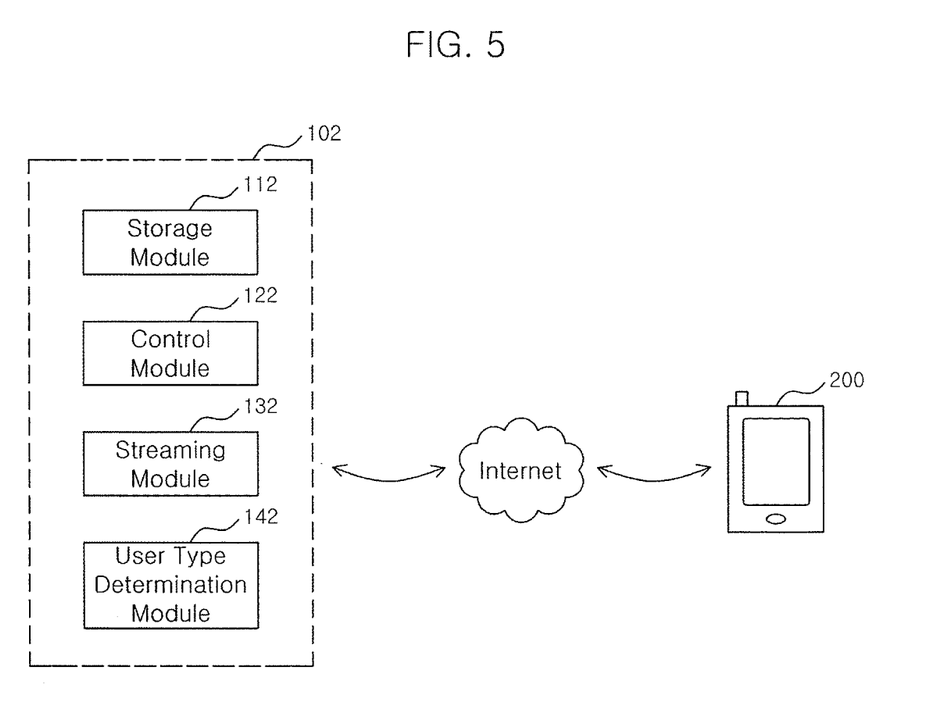
FIG. 5 illustrates a multi-view video streaming system according to another exemplary embodiment of the present invention.

FIG. 5 illustrates a multi-view video streaming system according to another exemplary embodiment of the present invention.

In the embodiment illustrated in FIG. 5, the multi-view video streaming system 102 streams a multi-view video to a user terminal 200 via the Internet or another network (e.g. a local area network (LAN)).

The multi-view video streaming system 102 includes a storage module 112, a control module 122, a streaming module 132 and a user type determination module 152. In some embodiments of the present invention, some of the above-described components may not be necessarily necessary for implementing the invention. The multi-view video streaming system 102 may include more components. In the description of FIG. 5, detailed descriptions of some features will be omitted in the case in which they are identical to those described above or easily conceivable.

The storage module 112 stores bulk video data corresponding to each of a plurality of predefined user types.

The bulk data may be in the form of a single file stored in a hard disk drive (HDD), or in some embodiments, may refer to a group of data stored in a cloud in a decentralized fashion or data stored in a buffer memory (e.g. a random access memory (RAM)). Hereinafter, the bulk data will be described as being a bulk file for the sake of convenience. However, it is apparent to a person skilled in the art to which the present invention relates that the bulk data may be applied in a variety of different forms.

According to an embodiment, each bulk file may include a plurality of individual-view videos encoded by multi-view coding (MVC). Herein, the MVC may include all coding technologies for encoding a plurality of individual-view videos into a single data file. In some implementations, the MVC may be one of a variety of standard technologies, such as H.264. In addition, each bulk file may be implemented as a file of images in which multi-views are multiplexed in a multi-channel container, such as moving picture expert group (MPEG)-2 transport stream (TS).

According to another embodiment of the present invention, each bulk file includes a series of bulk images arranged in the time sequence. The bulk images may be images that are selected from among images included in the plurality of individual-view videos included in the bulk data, correspond to the time corresponding to the bulk images, and are connected one or two-dimensionally. For example, assuming that the bulk file includes first to $m^{th}$ individual-view videos and that each of the individual-view videos includes images of times $t_1$, $t_2$, $t_3$, . . . , $t_{n-1}$ and $t_n$, where $t_1 < t_2 < t_3$, . . . , $t_{n-1} < t_n$, the bulk file includes bulk images corresponding to the times $t_1$, $t_2$, $t_3$, . . . , $t_{n-1}$ and $t_n$. A bulk image corresponding to a specific time $t_1$ ($1 <= i <= N$) is an image in which an image of the time $t_i$ of a first individual-view video, an image of the time $t_i$ of a second individual-view video, . . . , and an image of a time $t_i$ of an $m^{th}$ individual-view video are connected. In this case, in some embodiments, images of a specific time from among the individual-view videos included in a single bulk image are connected one-dimensionally (e.g. in a horizontal direction or a vertical direction) or two-dimensionally (e.g. in a horizontal direction and a vertical direction). In particular, the images are connected vertically when the horizontal size of the image of each individual-view video is greater than the vertical size. In contrast, the images are connected horizontally when the vertical size of the image of each individual-view video is greater than the horizontal size. In this case, the shape of the bulk image becomes closer to a square, thereby advantageously improving the encoding efficiency of the bulk image. In addition, delimiters (e.g. delimiting regions having a space, a specific color or a specific pattern) may further disposed such that each delimiter is interposed between the adjacent images of the individual-view videos included in the single bulk image. Therefore, when a typical video player plays the bulk stream, a single image in which several divided images are combined is output. According to this embodiment, the multi-view video streaming server 300 extracts time-specific images from all individual-view videos to be included in a bulk file, create bulk images by combining the extracted time-specific images, and create the bulk file by encoding the created bulk images by a typical video encoding method rather than a multi-view video encoding method. The multi-view video streaming system 100 crops a portion of a single bulk image corresponding to an image of a specific time to be displayed on the user terminal 200, and displays only the cropped portion of the single bulk image on the user terminal 200.

According to another embodiment of the present invention, a single bulk file is composed of a series of bulk images as in the above-described embodiment. However, in this embodiment, it is possible to divide an image of a specific time of each individual-view video to be included in a bulk image of the specific time into an R number of divided images having a predetermined size, and sequentially arrange the divided images, thereby creating the bulk image of the specific time. In particular, when the horizontal size of the image of the specific time of each individual-view video is greater than the vertical size, it is possible to horizontally divide the image of the specific time and vertically arrange the divided images. In contrast, when the vertical size of the image of the specific time of each individual-view video is greater than the vertical size, it is possible to vertically divide the image of the specific time and horizontally arrange the divided images. In this case, the shape of the bulk image becomes closer to a square, thereby advantageously improving the encoding efficiency of the bulk image.

Figure 6A:
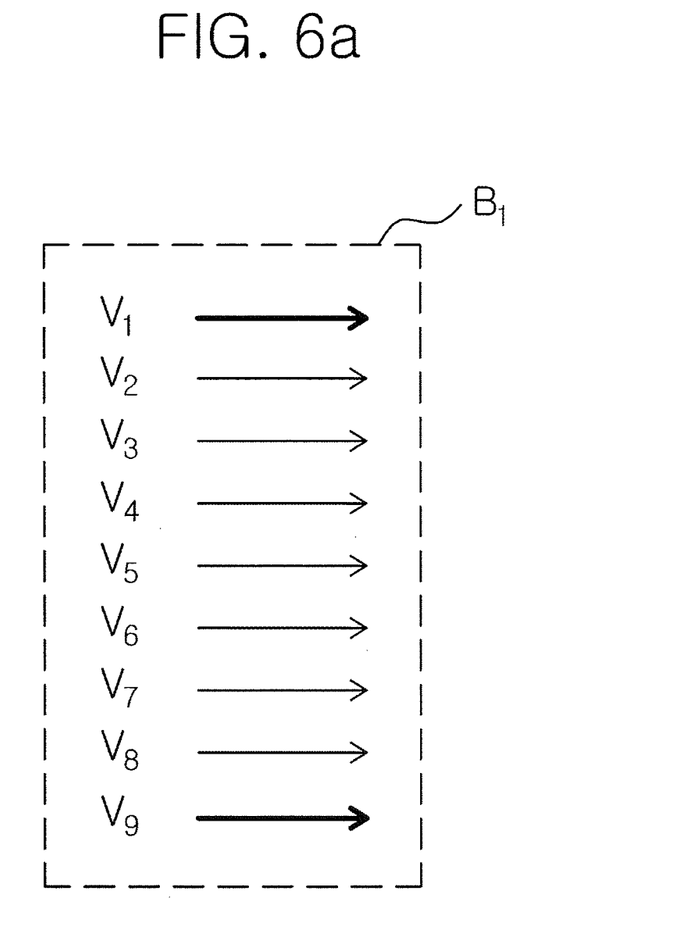
FIG. 6A to FIG. 6C illustrate bulk data corresponding to different three user types.
Figure 6B:
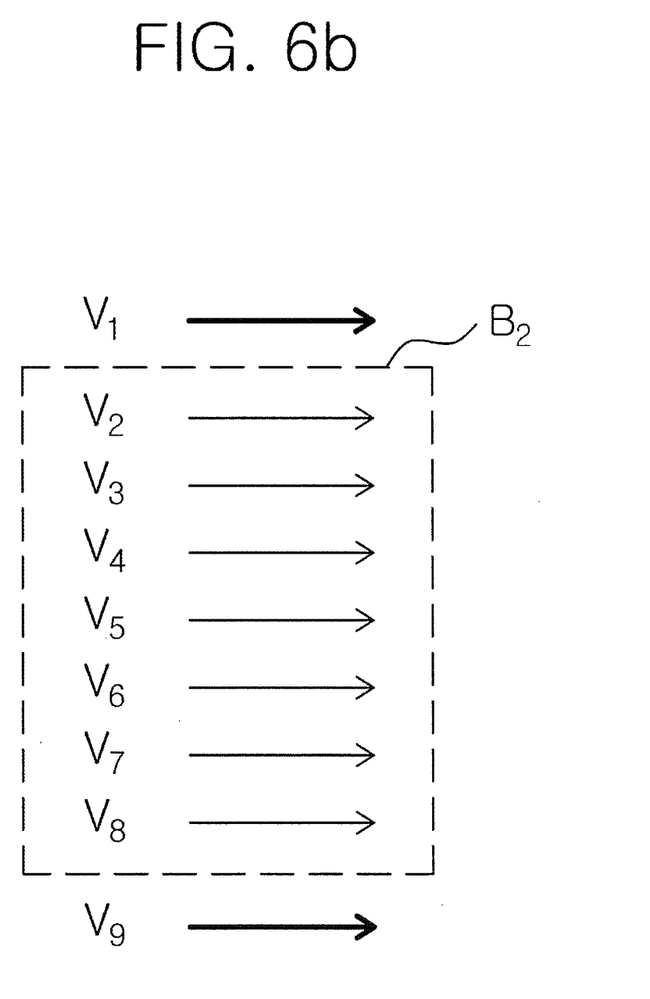
Figure 6C:
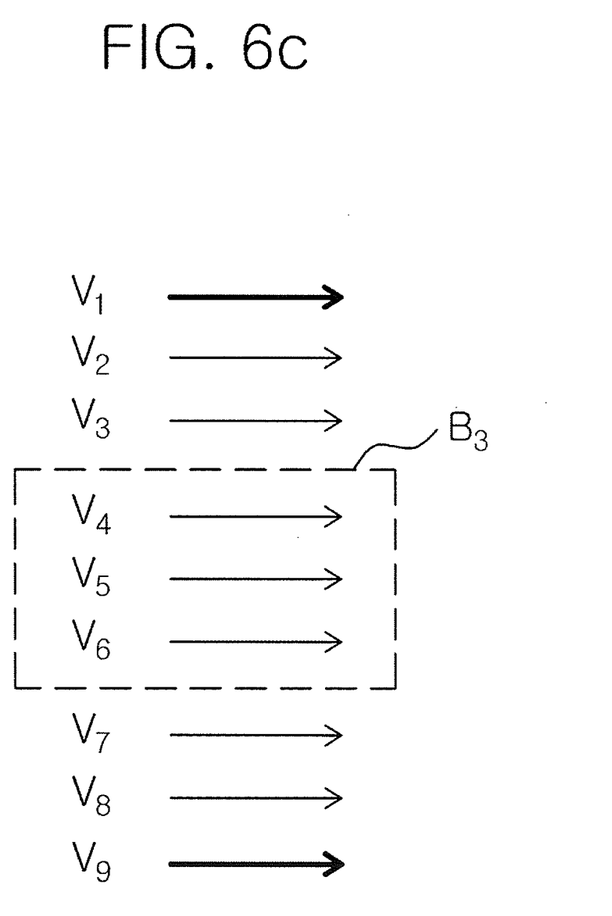

Bulk video data corresponding to each of the plurality of user types may include at least part of the plurality of individual-view videos taken at different views, examples of which are illustrated in FIG. 6A, FIG. 6B and FIG. 6C. FIG. 6A to FIG. 6C illustrate bulk data corresponding to different three user types.

As illustrated in FIG. 6A, the bulk data B1 includes all individual-view videos V1 to V9 of a multi-view video. For example, the bulk data B1 corresponds to a first type (e.g. an overcharge-type).

As illustrated in FIG. 6B, the bulk data B2 includes some individual-view videos V2 to V8 from among the all individual-view videos V1 to V9, and corresponds to a second type (e.g. an undercharge-type).

As illustrated in FIG. 6C, the bulk data B3 includes fewer individual-view videos V4 to V6 than the individual-view videos V2 to V8 of the bulk data B2, and corresponds to a third type (e.g. a free-type).

As illustrated in FIG. 6A to FIG. 6C, individual-view videos included in a single bulk data may be adjacent to each other. Alternatively, in some implementations, individual-view videos included in a single bulk data may be separated from each other. For example, a specific bulk data may include individual-view videos V2, V4 and V7 that are not adjacent to each other.

The streaming module 121 streams one of the plurality of bulk video data (e.g. the bulk data B1, B2 and B3 illustrated in FIG. 6A to FIG. 6C) or at least one individual-view video included in one of the plurality of bulk video data to the user terminal under the control of the control module 122.

The user type determination module 142 determines the user type of the user corresponding to the user terminal 200 from among the plurality of user types.

The control module 122 controls the streaming module 132 to stream a bulk video data corresponding to the user type of the user or at least one individual-view video included in the bulk video data corresponding to the user type of the user to the user terminal 200.

In the plurality of above-described embodiments according to the principle of the present invention, it is possible to stream a multi-view video to the user terminal 200. In an alternative embodiment, it is possible to receive a multi-view video from a separate multi-view video streaming server and display the multi-view video on the user terminal. A description will be given below of this embodiment with reference to FIG. 7.

Figure 7:
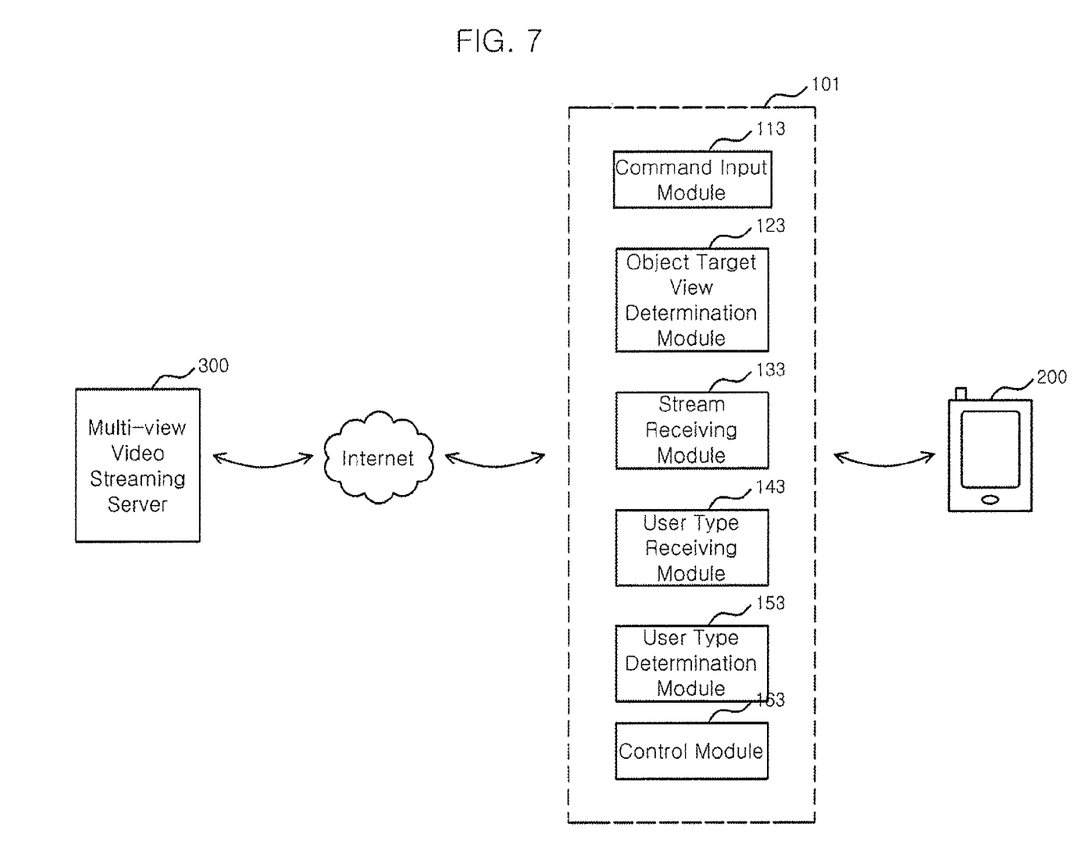
FIG. 7 illustrates a multi-view video streaming system according to a further exemplary embodiment of the present invention.

Referring to FIG. 7, a multi-view video streaming system 101 according to this embodiment is physically separate from a user terminal 200. The multi-view video streaming system 103 may be in the shape of, for example, a set-top box. In this case, the multi-view video streaming system 101 and the user terminal 200 can be connected to each other via a variety of wired/wireless connection method, such as a high-definition multimedia interface (HDMI), a universal serial bus (USB) and Wi-Fi. In some implementations, the multi-view video streaming system 103 may be embodied within the user terminal 200.

As illustrated in FIG. 7, the multi-view video streaming system 103 according to this embodiment includes a command input module 113, a target view determination module 123, a stream receiving module 133, a user type determination module 143 and a control module 163. In some embodiments of the present invention, some of the above-described components may not be necessarily necessary for implementing the invention. The multi-view video streaming system 102 may include more components. In the description of FIG. 7, detailed descriptions of some features will be omitted in the case in which they are identical to those described above or easily conceivable.

The command input module 113 has a view movement command input from a user.

The target view determination module 123 determines a target individual-view video to be streamed to the user terminal 200 from among a plurality of individual-view videos based on the view movement command. The plurality of individual-view videos are taken at different views and form a multi-view video.

Each of the plurality of individual-view videos is set to correspond to at least part of the plurality of predefined user types.

The stream receiving module 133 receives a video stream corresponding to the target individual-view video from the multi-view video streaming server 300. The multi-view video streaming server 300 streams bulk data including the target individual-view video. The target individual-view video may be included in the bulk data. In this case, the bulk file is encoded by, for example, MVC, and the stream receiving module 133 encodes a plurality of individual-view video streams included in the received bulk data.

The user type determination module 143 receives a user type set to the target individual-view video from the multi-view video streaming server 300.

The user type determination module 153 determines the type of the user corresponding to the user terminal 200 from among the plurality of user types.

The control module 163 displays the target individual-view video on the user terminal 200 when the type of the user corresponds to the user type set to the target individual-view video.

When the user type set to the target individual-view video is the charge-type, and the type of the user is the free-type, the control module 163 displays charging-guideline information on the user terminal.

As set forth above, the multi-view video streaming system according to the principle of the present invention limits or allows a predetermined view of a multi-view video according to the type of the user (e.g. the charge-type or the free-type), thereby providing a charge model suitable for multi-view videos.

In some implementations, the multi-view video streaming system may include a processor and a memory that preserves a program that the processor executes. The processor may be implemented as a single core central processing unit (CPU) or a multi-core CPU. The memory may be implemented as high-speed RAM; or may be implemented as nonvolatile memory, such as at least one magnetic disk storage device, a flash memory device or other nonvolatile solid-state memory. Access to the memory by the processor or other components may be controlled by a memory controller. When the program is executed by the processor, it enables the multi-view video streaming system according to this embodiment to execute a method of providing the multi-view video streaming system.

The method of providing the multi-view video streaming according to an embodiment of the present invention can be embodied as computer readable program commands and can be stored in a computer readable recording medium. In addition, a control program and a target program according to an embodiment of the invention can be stored in a computer readable recording medium. The computer readable recording medium includes all sorts of recording devices that store data readable by a computer system.

The program commands recorded in the recording medium may be specially designed and constructed for the present invention, or may be well-known to and used by a person skilled in the art related to software.

Examples of the computer readable recording medium may include, but not limited to, magnetic media, such as a hard disk, a floppy disk and a magnetic tape; optical media, such as compact disc read-only memory (CD-ROM) and a digital versatile disc (DVD); magneto-optical media, such as a disk; a read-only memory (ROM); and other hardware devices specially constructed to store and execute program commands, such as read-only memory (ROM), random-access memory (RAM) and flash memory. The computer readable recording medium may also be in the form of light or a carrier wave that conveys signals specifying program commands, data structures, or the like, or a transmission medium, such as a metal wire or a waveguide. In addition, the computer readable recording medium may be distributed to computer systems on the network, in which computer readable codes are stored and executed in a decentralized fashion.

Examples of the program commands include not only machine languages generated by compilers, but also high-level languages that may be executed by an information processing device, for example, a computer, that electronically processes information using an interpreter.

The hardware devices described above may be constructed such that they can operate as one or more software modules for performing the operations of the present invention, and vice versa.

While the present invention has been illustrated and described with reference to the certain exemplary embodiments thereof, it will be understood by those skilled in the art that various changes in form and details may be made therein without departing from the spirit and scope of the invention as defined by the appended claims. Therefore, the foregoing embodiments should be understood as being illustrative but not limitative purposes. For example, some parts described as being located in a single physical entity can be implemented as being distributed to a plurality of physical devices. In the same fashion, some parts described as being distributed to a plurality of physical devices can be located in a single physical entity.

The scope of the present invention is defined not by the detailed description of the invention but by the appended claims, and all differences within the scope will be construed as being included in the present invention.

What is claimed is:

1. A multi-view video streaming system comprising:
    a streaming module configured to stream a plurality of individual-view videos capturing a single event by a plurality of cameras at different locations, each individual-view video being assigned to a predetermined viewing level,
    a user command receiving module configured to receive a view movement command of a user for switching from the first individual-view video captured from a first location to a second individual-view video captured from a second location that is the most adjacent to the first location in a direction of the view movement command from the first location;
    a control module configured:
        to determine if the user is eligible for viewing the second individual-view video based on the second individual-view video's predetermined viewing level, and
        if determined that the user is not eligible for viewing the second individual-view video, to further determine if the user is eligible for viewing a third individual-view video captured from the second most adjacent to the first location in the direction of the viewing movement command from the first location based on the third individual-view video's predetermined viewing level;
        if determined that the user is eligible for viewing the third individual-view video, to cause the streaming module to stream the third individual-view video to a user terminal.

2. The multi-view video streaming system according to claim 1, wherein the control module is further configured, when the user is eligible for no individual-view video other than the first individual-view video, to cause the streaming module to stream the first individual-view video.

3. A method of streaming videos, the method comprising:
    streaming to a user terminal a first individual-view video among a plurality of individual-view videos capturing a single event by a plurality of cameras at different locations, each individual-view video being assigned to a predetermined viewing level, the first individual-view video being captured from a first location;
    receiving, from a user, a view movement command for switching from the first individual-view video to a second individual-view video captured from a second location that is the most adjacent to the first location in a direction of the view movement command from the first location;
    in response to receipt of the view movement command, determining if the user is eligible for viewing the second individual-view video based on the second individual-view video's predetermined viewing level; and
    if determined that the user is not eligible for viewing the second individual-view video, further determining if the user is eligible for viewing a third individual-view video captured from the second most adjacent to the first location in the direction of the viewing movement command from the first location based on the third individual-view video's predetermined viewing level;
    if determined that the user is eligible for viewing the third individual-view video, beginning to stream the third individual-view video.

4. The method according to claim 3, further comprising when the user is eligible for no individual-view video other than the first individual-view video, streaming the first individual-view video.

5. A non-transitory computer readable medium storing instructions that when executed, cause one or more processors to perform the method as claimed in claim 3.

6. A multi-view video streaming system comprising:
    a processor; and
    a non-transitory computer readable medium storing instructions that when executed, cause the processors to perform the method of claim 3.

* * * * *